United States Patent [19]
Graham

[11] Patent Number: 5,362,079
[45] Date of Patent: Nov. 8, 1994

[54] BEACH CADDY

[76] Inventor: Gary Graham, 309 E. Monterey Ave., Wildwood Crest, N.J. 08260

[21] Appl. No.: 75,897

[22] Filed: Jun. 14, 1993

[51] Int. Cl.⁵ .......................... B62B 1/04; B62B 1/06
[52] U.S. Cl. .................. 280/47.23; 280/47.25; 280/47.27; 280/79.2; 297/217
[58] Field of Search .............. 280/47.23, 47.24, 47.25, 280/47.27, 79.7, 30, 79.2; 297/27, 28, 30, 217

[56] References Cited
U.S. PATENT DOCUMENTS

| | | | |
|---|---|---|---|
| 2,546,509 | 3/1951 | Huff | 280/47.23 X |
| 4,514,009 | 4/1985 | Vanderminden | 297/27 |
| 4,630,838 | 12/1986 | Stockton | 280/79.7 X |
| 4,733,905 | 3/1988 | Buickerood et al. | 280/47.25 X |
| 4,838,608 | 6/1989 | Hansen-Smith et al. | 297/27 |
| 4,852,895 | 8/1989 | Moffitt | 280/63 X |
| 4,934,719 | 6/1990 | duPont | 280/47.24 X |
| 4,943,073 | 7/1990 | Wander | 280/47.27 |
| 4,968,049 | 11/1990 | Johnson | 280/47.24 |

FOREIGN PATENT DOCUMENTS 47673  6/1937  France ......................... 280/47.27

*Primary Examiner*—Brian L. Johnson
*Attorney, Agent, or Firm*—Norman E. Lehrer

[57] ABSTRACT

An article carrying device comprising a hand cart and a beach chair. The article carrying device or beach caddy is comprised of a hand cart having a substantially triangular body wherein the point of the triangle has a handle and is the upper portion and the horizontal portion of the triangle is a base plate and forms the lower portion of the cart. A cylindrical rod is integrally attached to the base plate and passes through the hollow center of the same. The cylindrically shaped rod acts as an axle whereupon wide based wheels are attached to each end. The base plate has an L-shaped seat extending from its lowest edge which is adapted to engage a leg of a beach chair. Any beach chair having a substantially closed headrest support and legs can be used wherein the support is placed over the upper portion of the triangular body member and a leg is placed into the seat. Accordingly, the beach chair is securely attached to the triangularly shaped member. With the beach chair attached, articles to be carried to and from the beach can be placed upon the chair. When the beach chair is sufficiently full, bungee cords or the like can be used to secure the articles to the chair and the beach caddy can be pushed or pulled to its destination.

10 Claims, 2 Drawing Sheets

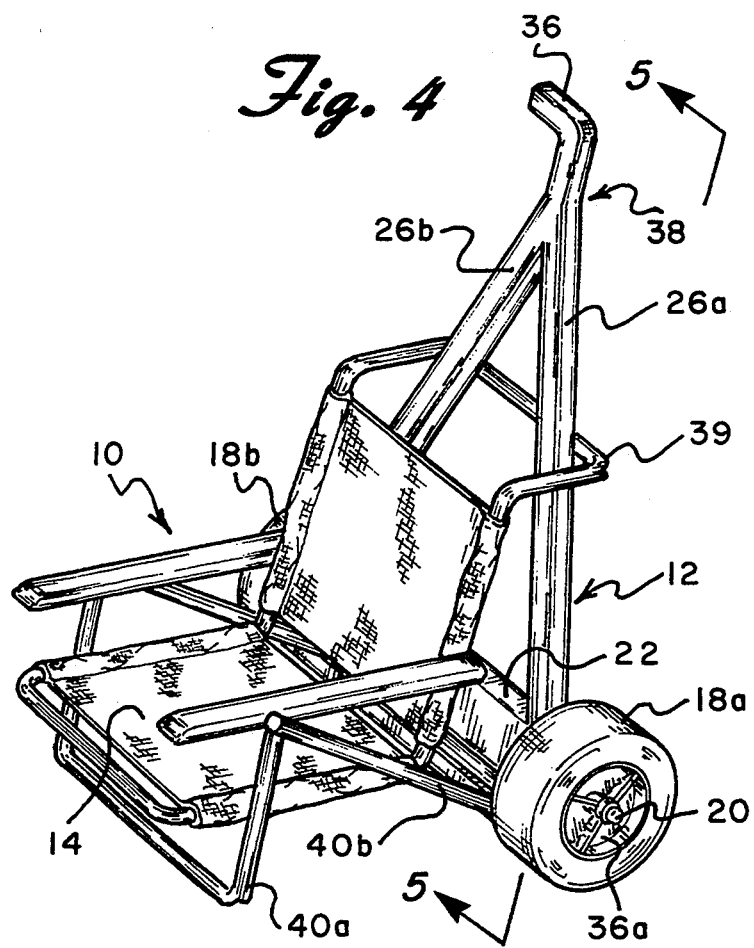
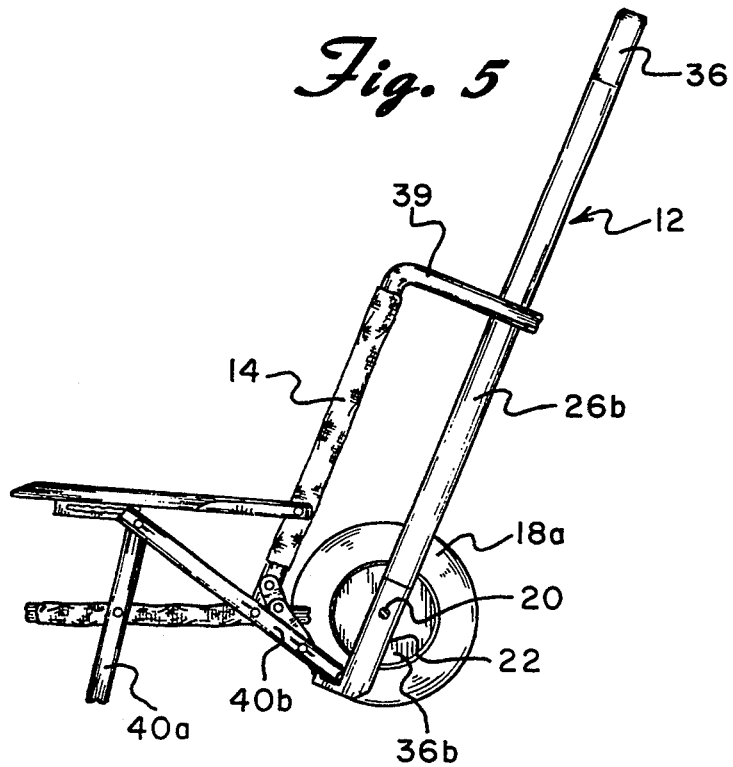

BEACH CADDY

BACKGROUND OF THE INVENTION

This invention relates to hand carts and, more particularly, to a hand cart combined with a beach chair specially designed for transporting beach articles to and from the beach. By attaching a beach chair to the cart, a large number of beach type articles can be carried to the beach and back with ease.

Hand carts are used in general for moving articles or materials from one place to another that are not otherwise easily transportable. Most carts are designed for a particular task, although some carts are for general purposes. Carts have been designed to carry luggage, furniture, plywood and piping. In addition, carts have been designed to be collapsible and portable so as to ease the transport of the cart itself. While some of these carts may be adapted to be used for carrying beach type articles to and from the beach, none discloses all the advantages of the instant invention including the high capacity of the same.

U.S. Pat. No. 4,943,073, for example, to Wander discloses a hand truck having a triangularly shaped body, formed by elongated rods used for transporting heavy flat articles. The Wander hand truck includes a perpendicularly extending toe extending from a plate which extends from and is attached to the bottom of the hand truck. The orientation, however, of the wheels of the Wander invention is different from that of the instant invention. The Wander hand truck has only one wheel which is arranged parallel to the triangularly shaped main body structure. Because of the one thin wheel and the lack of any body structure for engaging a beach chair for increasing the capacity of the cart, the Wander invention is not conducive for use in carrying beach articles to and from the beach.

U.S. Pat. No. D281,112 to Nichols discloses a cart for a bowling ball bag. The Nichols cart consists of a triangularly shaped handle, an elongated vertical rod and a horizontally extending base plate having a perpendicularly extending toe. The Nichols cart has two wheels, one on each side of the base plate. The cart is adapted to carry a bowling bag by placing the toe under the bag and rolling the cart at an angular orientation. While the cart does have two wide wheels, it lacks the body for engaging a beach chair as in the instant invention.

U.S. Pat. No. D302,959 to Turlington, Jr. discloses an invalid carrying beach chair. The Turlington invention is substantially a hand drawn carriage for transporting an invalid. The cart comprises a substantially horizontally extending trailer having two large wheels, an axle and two elongated grasping members for pulling the cart. In addition, a lounge type beach chair is permanently attached to the upper portion of the horizontally extending carriage for supporting a person. Accordingly, the person is placed into the chair and the carriage can be drawn by hand or otherwise to the destination. While the Turlington invention can be adapted to carry articles to and from the beach, it is directed mainly towards the carrying of a disabled person. As such, the carriage is of much greater size and weight than the instant invention and cannot be easily broken down and stored as with the instant invention.

In addition to the foregoing, U.S. Pat. Nos. 4,759,559 to Moulton, D 172,026 to Hoye, D 208,770 to Curtis, 4,426,099 to Gross and, finally, 3,180,507 to Ott et al. disclose hand carts or supports having substantially triangularly shaped bodies. In addition, each of these carts has a perpendicularly extending lower toe for supporting the article for which it was made to carry. However, each of the carts disclosed in these patents lacks at least one important feature of the instant invention. Accordingly, the size and orientation of the wheels, the lack of the ability of the toe to engage a beach chair leg, the lack of the triangularly shaped frame having the capacity to engage a beach chair and the lack of a beach chair are examples of the shortcomings.

SUMMARY OF THE INVENTION

This invention is a hand cart for transporting beach articles to and from the beach. The cart is substantially triangularly shaped and incorporates the use of an average beach chair by engaging the same and creating a high capacity carrying cradle. The hand cart is easily storable in that the beach chair is readily removable and foldable and the chair and cart are lightweight.

The invention is comprised of a triangularly shaped vertically extending frame having a handle at the top end thereof and an axle, a base plate and two wheels at the bottom end. The frame can be constructed from tubing or other lightweight material. At the bottom end, the base plate forms the horizontal portion of the triangle and the bottom of the frame having a rod extending parallel and attached thereto for engaging rotatable and wide wheels. The base plate has a perpendicularly extending toe projecting therefrom, and the toe has a perpendicularly and vertically extending member extending further therefrom.

The triangularly shaped frame has holes or the like therein for engaging a bungee cord or rope for securing the articles to be carried thereon. The invention further includes the triangularly shaped frame being adapted to engage a support member of a beach chair while the perpendicularly extending toe engages a leg member of the same. As such, the average beach chair is securely attached to the hand cart. With the hand cart attached to the chair, a large capacity carrying surface is available for carrying beach articles to and from the beach.

The hand cart is used by placing one leg of an average beach chair into the perpendicularly extending toe area while the head support member is placed over and around the triangularly shaped frame. The chair is somewhat securely arranged on the hand cart. Beach articles including additional chairs, coolers, games, blankets and towels can be placed onto the beach chair surface and secured therein via bungee cords or the like wrapped around the articles and attached to the triangularly shaped frame. With the articles thereon, the beach chair becomes more securely attached to the frame and the hand cart is ready for transport. The upper handle is simply grabbed and the cart is placed on a angle and pushed or pulled on the pavement, beach or the like until the desired destination is reached.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 4 is a perspective view of the beach caddy as shown in FIG. 1 but without the beach articles thereon, and FIG. 5 is a side view of the beach caddy taken along line 5—5 of FIG. 4.

DETAILED DESCRIPTION OF THE PREFERRED EMBODIMENT

Figure 1:
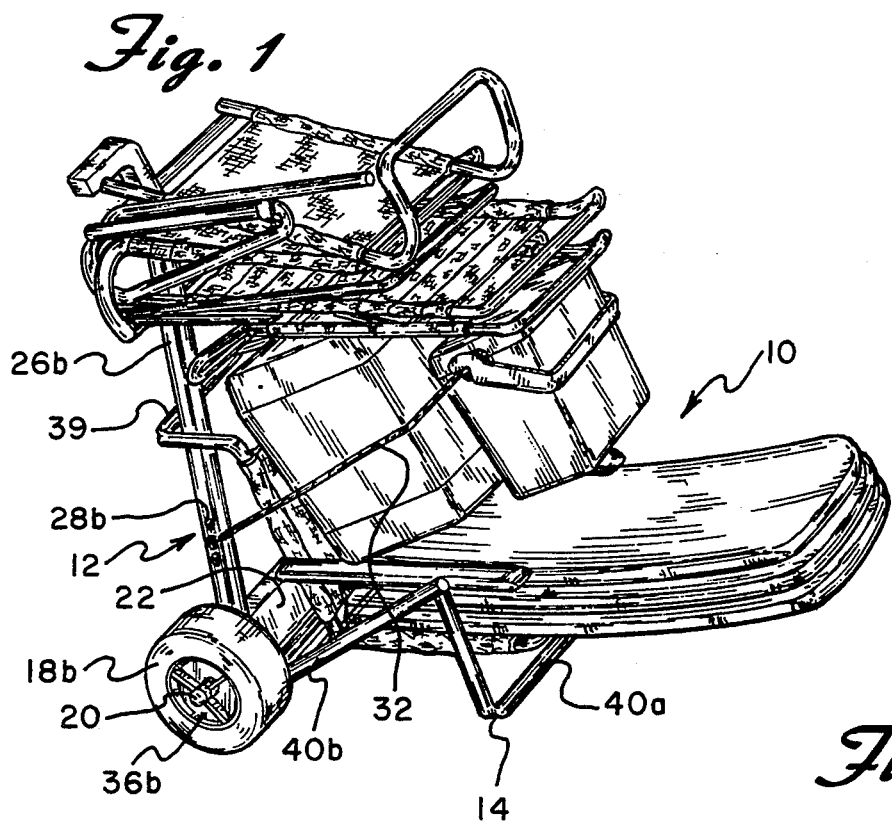
FIG. 1 is a perspective view of the beach caddy having a load of beach articles thereon.

Referring now to the drawings in detail wherein like reference numerals have been used throughout the various figures to designate like elements, there is shown in FIG. 1 a perspective view of the beach caddy constructed in accordance with the principals of the present invention and having articles to be transported thereon and designated generally as 10. The beach caddy 10 is comprised of the cart 12 and the beach chair 14.

Figure 2:
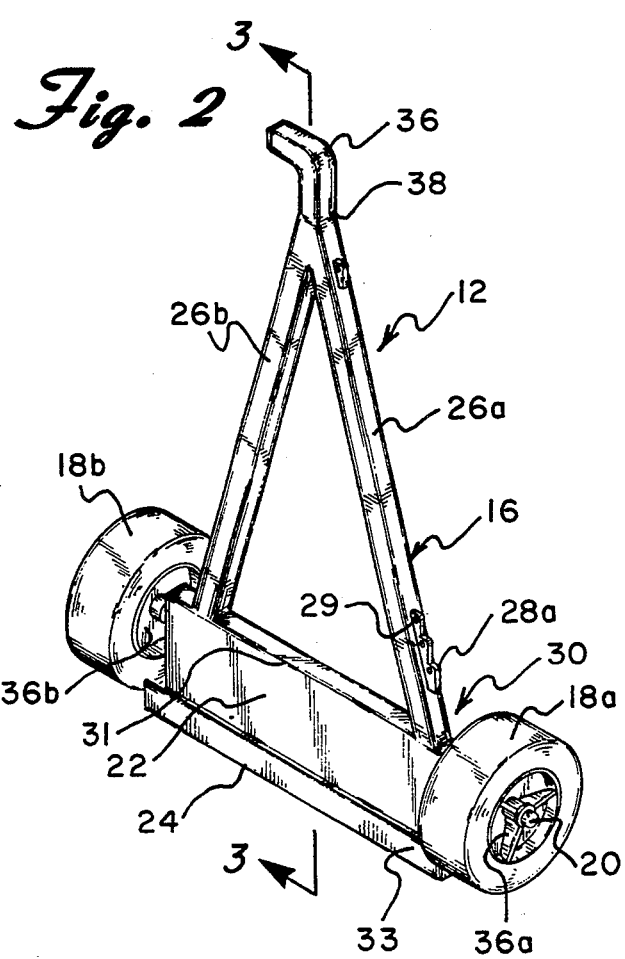
FIG. 2 is a perspective view of the cart portion of the present invention prior to the placement thereon of a beach chair.

Referring now to FIG. 2, the cart 12 is comprised of the triangular body member 16, the wheels 18a and 18b, the axle 20, the base plate 22 and the seat 24. The triangular body member 16 is formed from any shaped tubing, preferably rectangularly shaped rigid tubing, wherein the tubing 26a and 26b, and the base plate 22 are integrally joined in a triangular shape. On each side of the triangular body member 16, there extends a mounting plate 28a and 28b attached substantially adjacent the base plate end 30 of the triangular body member 16. Each mounting plate 28a and 28b is integrally attached to the tubing 26a and 26b, respectively, extending perpendicularly therefrom. The mounting plates are formed into a step like configuration wherein under each step, a hole such as shown at 29 extends through the plate, adapted to engage a bungee cord 32 or other similar flexible member having a hooked end for engagement with the holes. As shown in FIG. 2, the base plate 22 forms the horizontal portion of the triangular body member 16.

Figure 3:
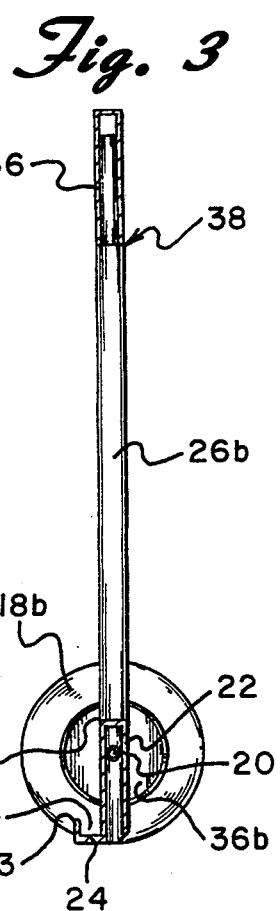
FIG. 3 is a side view taken along line 3—3 of FIG. 2.

The base plate 22 is substantially rectangular in shape and integrally connected to the tubing 26a and 26b on its upper side. The base plate 22 is of a length extending beyond the outside edges of the bottom end of the tubing 26a and 26b. The base plate 22 is of a height substantially greater than the width of the tubing 26a or 26b so as to provide a sufficient support surface. The base plate is substantially rectangular in shape and hollow and has an axle 20 extending horizontally therethrough and integrally attached. The axle 20 is attached substantially adjacent to the inside top edge 31 of the base plate preferably by welding such that the axle 20 is parallel to the upper edge 31 of the base plate 22. The axle 20 is a cylindrically shaped rod that extends substantially outward beyond each side of the base plate 22. Additionally, the base plate 22 has a seat 24 extending from the lower edge thereof. The seat 24 is a substantially L-shaped angle member which extends perpendicularly from the base plate 22. As shown in FIG. 3, the seat 24 is attached to the lower portion of the base plate 22 such that a toe 33 of the L configured member is spaced outward from the base plate 22 and extends substantially parallel to the base plate 22. As such, a seat area 34 is formed for the placement of a leg from the beach chair 14 wherein the seat area is of slightly greater width than the chair leg.

The axle 20 has wheels 18a and 18b attached to the ends of the axle such that the wheels 18a and 18b rotate freely. The wheels are wide for easy movement upon soft surfaces such as beach sand. The wheels 18a and 18b are attached to the axle 20 in a rotational manner via bearings located in the wheel rims 36a and 36b. The triangular body member 16 has an L-shaped handle 36 extending from the upper portion or point 38.

The beach caddy is used by first placing the beach chair 14 over the hand cart portion 12. The beach chair 14 is essentially a common beach chair found in most department stores. The beach chair has legs 40a and 40b and crossbar support 39 wherein leg 40b and support 39 are used for placement onto the hand cart 12. Support 39 of chair 14 is placed over the triangular body member 16 of the cart 12 at its upper pointed end 38 as shown in FIG. 4. The lower leg 40b of the chair 14 is placed into the seat area 34 such that the chair 14 is secured into the hand cart 12 as shown in FIG. 5. At this stage, the chair 14 may be loaded with beach articles as shown in FIG. 1, such as coolers, rafts, additional chairs and the like.

When the chair is sufficiently loaded as shown in FIG. 1, bungee cord 32 is connected to one side of the body 16 at the mounting plate 28a and wrapped around the loaded articles and similarly attached to the other side of the triangular body member 16 and mounting plate 28b. The bungee cord 32 will securely hold the articles in the chair portion. With the beach caddy loaded as shown in FIG. 1, the hand cart and beach chair are simply tilted backwards towards the user and the beach caddy is pushed or pulled to the destination.

When the beach caddy is not being used, it can be transformed into a compact arrangement for storage. The chair 14 can be easily removed from the cart 12 and folded and stored with or without the cart against a wall or in a storage area. Alternatively, the chair may remain attached to the cart and folded thereon. As such, it is preferable that the lower leg 40b remain securely attached within the seat 24 adjacent the toe 33 to ease this storage method. Removable straps or the like can be used to secure the lower leg 40b to the seat 24 so as to allow folding and storage of the apparatus as a single unit, allowing it to be ready for use without assembly.

The present invention may be embodied in other specific forms without departing from the spirit or essential attributes thereof and accordingly reference should be made to the appended claims rather than to the foregoing specification as indicating the scope of the invention.

What is claimed is:

1. An apparatus for transporting articles comprising:
    a cart including carrying means and an upwardly extending rigid frame means, said carrying means having a pair of wheels rotatably mounted thereto, said rigid frame means having a top end and a bottom end connected to said carrying means;
    a folding chair having a front leg means and a rear leg means, said front leg means being pivotally connected to said rear leg means at their opposite free ends, said folding chair further having a seat portion and a back rest portion positioned between said front leg means and said rear leg means, said rear leg means being secured in said carrying means, and
    a crossbar extending from the top of said back rest portion of said chair for securing said folding chair to said rigid frame means of said cart, said crossbar being positioned rearwardly of said back rest portion whereby an opening remains between said crossbar and said back rest portion, said rigid frame means extending upwardly through said opening.

2. The apparatus of claim 1 further comprising a handle extending from said top end of said frame means, said handle lying in substantially the same plane as said frame means.

3. The apparatus according to claim 2 wherein said carrying means comprises a base plate attached to and extending from said bottom end of said frame means, said base plate having engagement means carried thereon, said frame means comprising a pair of elongated members extending upwardly from said base plate and converging to a common point adjacent said top end thereof.

4. The apparatus of claim 3 further comprising connection means attached to said elongated members of said frame means and securing means attached to said connection means for securing said articles within said seat portion of said folding chair.

5. The apparatus of claim 4 wherein said front leg means is substantially U-shaped and said rear leg means is substantially U-shaped.

6. The apparatus of claim 5 wherein said engagement means includes an extension projecting from said plate forming a seat, said rear leg means sitting in said seat.

7. The apparatus according to claim 4 wherein said connection means comprises connection plates extending from said elongated members, said securing means comprising an elongated flexible member attached to said connection plates and secured around said articles for securing the same to said apparatus.

8. The apparatus according to claim 3 wherein said chair is adapted to be folded while remaining connected to said cart, said rear leg means being adapted to remain attached to said engagement means during said folding of said chair for allowing compact storage of said apparatus.

9. The apparatus according to claim 6 wherein said extension includes a toe extending parallel to said plate.

10. The apparatus according to claim 1 wherein said wheels are substantially wide for easing movement on soft surfaces.

* * * * *